(12) United States Patent
Dayalan et al.

(10) Patent No.: US 11,726,766 B2
(45) Date of Patent: Aug. 15, 2023

(54) METHOD AND APPARATUS FOR MAINTAINING SOFTWARE OF A CONTROL UNIT FOR AN INDUSTRIAL CONTROL SYSTEM

(71) Applicant: Trane International Inc., Davidson, NC (US)

(72) Inventors: Udhaya Kumar Dayalan, Lino Lakes, MN (US); James K. McKeever, Blaine, MN (US)

(73) Assignee: Trane International Inc., Davidson, NC (US)

( * ) Notice: Subject to any disclaimer, the term of this patent is extended or adjusted under 35 U.S.C. 154(b) by 57 days.

(21) Appl. No.: 17/456,784

(22) Filed: Nov. 29, 2021

(65) Prior Publication Data

US 2023/0168878 A1  Jun. 1, 2023

(51) Int. Cl.
 *G06F 8/65* (2018.01)
 *G05B 19/042* (2006.01)

(52) U.S. Cl.
 CPC ............ *G06F 8/65* (2013.01); *G05B 19/042* (2013.01); *G05B 2219/25339* (2013.01)

(58) Field of Classification Search
 None
 See application file for complete search history.

(56) References Cited

U.S. PATENT DOCUMENTS 10,430,263 B2 * 10/2019 Polar Seminario ..... H04L 67/34
2010/0249956 A1    9/2010 Bliss et al.
2013/0263104 A1   10/2013 Baset et al.
2014/0173580 A1    6/2014 McDonald et al.
2014/0282458 A1 *  9/2014 Gupta .................... G05B 15/02
                                              717/168
2015/0277887 A1 * 10/2015 Hoch ..................... H04L 63/061
                                              713/171

(Continued)

FOREIGN PATENT DOCUMENTS

WO  WO-2012177597 A1 * 12/2012  ............... G06F 8/65
WO     2020/052960 A1    3/2020
WO  WO-2020052960 A1 *  3/2020  ............... G06F 8/65

*Primary Examiner* — Philip Wang
*Assistant Examiner* — Rongfa P Wang
(74) *Attorney, Agent, or Firm* — Womble Bond Dickinson (US) LLP (57) ABSTRACT

The present disclosure provides a method and apparatus for maintaining computer software of a supervisory control unit (SCU) of an industrial control system (ICS) configured to control equipment of a facility. The method includes capturing status information for the SCU and equipment that indicates at least performance of the SCU and the equipment, and connectivity of the SCU with the equipment. The method includes patching the computer software automatically to update, change, fix, or improve the computer software. The method includes capturing corresponding status information for the SCU and equipment and performing an audit of the ICS after the patch in which the status information and the corresponding status information are compared to identify any deviations in the performance or the connectivity of the equipment resulting from the patch. The method includes generating an audit report of the ICS that indicates any of the deviations that satisfy a reporting threshold.

20 Claims, 7 Drawing Sheets

(56) References Cited

U.S. PATENT DOCUMENTS

| | | |
|---|---|---|
| 2016/0033941 A1 | 2/2016 | T et al. |
| 2018/0267794 A1* | 9/2018 | Atchison .................. F24F 11/58 |
| 2019/0094827 A1* | 3/2019 | Park ....................... G05B 15/02 |
| 2019/0108013 A1* | 4/2019 | Duraisingh ......... H04L 43/0817 |
| 2020/0249646 A1* | 8/2020 | Gupta ....................... G06F 8/65 |
| 2020/0293303 A1* | 9/2020 | Gubbala .................. G06F 8/65 |
| 2021/0029151 A1* | 1/2021 | Brooks ................ H04L 9/3218 |

* cited by examiner

416 — CONNECT A COMPUTER TO THE SCU TO ESTABLISH A CONNECTION BETWEEN THE COMPUTER AND THE SCU

FIG. 4B 406, 410

418 — STORE THE STATUS INFORMATION AND THE CORRESPONDING STATUS INFORMATION INTO RESPECTIVE RECORDS IN A DATABASE

FIG. 4C

420 — VERIFY THAT THE SCU HAS RETURNED TO A DESIGNATED ZERO WAIT STATE AFTER REBOOT, BEFORE THE CORRESPONDING STATUS INFORMATION FOR THE SCU AND EQUIPMENT IS CAPTURED

FIG. 4D

422 — IDENTIFY AN INSTRUCTION FOR AN ACTION TO ADDRESS THE PARTICULAR DEVIATION, FROM A LIBRARY OF INSTRUCTIONS TO ADDRESS POSSIBLE DEVIATIONS

424 — PROVIDE THE INSTRUCTION FOR EXECUTION OF THE ACTION TO ADDRESS THE PARTICULAR DEVIATION

METHOD AND APPARATUS FOR MAINTAINING SOFTWARE OF A CONTROL UNIT FOR AN INDUSTRIAL CONTROL SYSTEM

TECHNOLOGICAL FIELD

The present disclosure relates generally to industrial control systems and smart building control systems and, in particular, to maintaining software or firmware on controller(s) of an industrial control system or smart building control system.

BACKGROUND

Industrial control systems, including smart building control systems, are commonly used to control many aspects of a building or campus computer connected and controlled industrial equipment. For example, industrial environmental equipment (e.g., HVAC, boilers, etc.) can be controlled by building and campus control systems such as industrial control systems (ICS) that are operated on site or remotely by users or computing systems. Buildings and campuses include one or more HVAC systems, along with various embedded systems, sensors, transducers, and thermostats connected via a network to a centralized controller, sometimes referred to as a supervisory control unit (SCU). The SCU is configured to send and receive messages to and from the various components and control the components based on settings chosen by a user and based on data received by the sensors and other embedded systems connected to the SCU. For example, if a certain floor of the building has been set to a temperature of 65° F., and the thermostat in that floor determines that the temperature is 68° F., the SCU may send a message to the HVAC system to divert cooler air to that floor.

The SCU, such as a building controller, utilizes specialized software or firmware to perform various control tasks. Firmware is used by embedded and other systems to perform tasks without having to go through an operating system, application programming interface (API), or device drivers. Like all software, firmware periodically needs to be patched, such as a software or firmware upgrade or update. However, in many cases, following a firmware or software patch on the SCU, it is cumbersome to determine if the patch was successful and no or minimal unintended consequences occurred as a result (e.g., the SCU loses connectivity to previously connected transducers, controllers, PLCs, and the like). For example, following a firmware patch, if the new firmware version is incompatible with a device the SCU controls (e.g., a thermostat), the device may show up as being disconnected or down. Discovering these sorts of issues usually requires the user performing the patch to manually check to determine if all of the devices that were up and connected to the SCU prior to the patch are up and connected to the SCU after the patch. In many cases, a manual check of all the connected devices does not occur and only a subset of the connected devices is checked. Furthermore, there is not a uniform method of determining the status of the entire system after a patch. Moreover, if an issue is detected (e.g., a connectivity issue, or an HVAC unit is no longer outputting air at the proper temperature) there is no way to determine the issue without manually checking systems and there are no remedies that automatically run following the identification of an issue.

It would therefore be desirable to have a system and method that takes into account at least some of the issues discussed above, as well as other possible issues.

BRIEF SUMMARY

Example implementations of the present disclosure are directed to methods and apparatuses for maintaining computer software of a supervisory control unit (SCU) of an industrial control system (ICS) configured to control equipment of a facility. The subject matter of the present disclosure includes steps taken before and after a software or firmware patch of the SCU occurs. Before a software or firmware patch is installed on the SCU, status information for the SCU and equipment (controlled by the ICS) that includes a status of the SCU and equipment (e.g., powered up/down) and connectivity information between the SCU and equipment (e.g., are they still connected over their network), is gathered and stored in a database. The patch (e.g., upgrade or update) is then applied to the SCU. After a sufficient amount of time has been given for the SCU to re-enter a steady-state or designated zero wait state, post-patch operation, the SCU and equipment status and network connectivity information is recollected and compared to the previously captured information. An audit report is generated, and, optionally, other steps are taken based on the comparison and based on the status of the SCU and equipment following the patch.

The present disclosure thus includes, without limitation, the following example implementations.

Some example implementations provide a method of maintaining computer software of a supervisory control unit (SCU) of an industrial control system (ICS) configured to control equipment of a facility, the method comprising: initiating a patch of the computer software of the SCU; and patching the computer software automatically as a direct result of the initiating, including: capturing status information for the SCU and equipment that indicates at least performance of the SCU and the equipment, and connectivity of the SCU with the equipment; applying the patch to the computer software of the SCU to update, change, fix, or improve the computer software; and capturing corresponding status information for the SCU and equipment; performing an audit of the ICS after the patch in which the status information and the corresponding status information are compared to identify any deviations in the performance or the connectivity of the equipment resulting from the patch; and generating an audit report of the ICS after the patch based on the audit, and that indicates any of the deviations that satisfy a reporting threshold.

Some example implementations provide an apparatus for maintaining computer software of a supervisory control unit (SCU) of an industrial control system (ICS) configured to control equipment of a facility, the apparatus comprising: a memory configured to store computer-readable program code; and one or more processors configured to access the memory, and execute the computer-readable program code to cause the apparatus to at least: initiate a patch of the computer software of the SCU; and patch the computer software automatically as a direct result of initiation of the patch, including the apparatus caused to: capture status information for the SCU and equipment that indicates at least performance of the SCU and the equipment, and connectivity of the SCU with the equipment; apply the patch to the computer software of the SCU to update, change, fix, or improve the computer software; and capture corresponding status information for the SCU and equipment; perform an audit of the ICS after the patch in which the status information and the corresponding status information are compared to identify any deviations in the performance or the connectivity of the equipment resulting from the patch; and generate an audit report of the ICS after the patch based on the audit, and that indicates any of the deviations that satisfy a reporting threshold.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Figure 1:
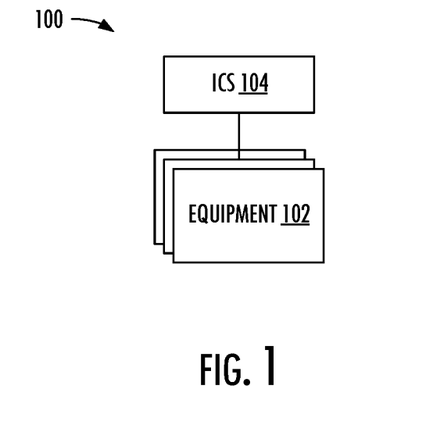
FIG. 1 illustrates a block diagram of a facility, according to some example implementations of the present disclosure.

Example implementations of the present disclosure are directed to control of equipment of a facility. In this regard, FIG. 1 illustrates a facility 100 according to various example implementations of the present disclosure. The facility may be an industrial facility, institutional facility, commercial facility, residential facility, campus and the like. In some examples, the facility includes one or more buildings such as industrial buildings, institutional buildings, commercial buildings, residential buildings and the like. Even further, examples of suitable commercial buildings include office buildings, warehouses, retail buildings and the like.

The facility 100 is generally any facility with equipment 102 such as environmental control equipment configured to control environmental conditions in confined areas of the facility. The equipment may include, for example, heating, ventilation and air conditioning (HVAC) equipment such as an HVAC system and associated components such as air handling units, variable air volume (VAV) units, compressors, air movers, chillers, furnaces, and ventilators. Other examples of suitable equipment include lighting control equipment, shading control equipment, security systems, and other mechanical, electrical equipment. The facility also includes an industrial control system (ICS) 104 such as a supervisory control and data acquisition (SCADA) system, distributed control system (DCS) or the like. A more specific example of a suitable DCS is a building automation system (BAS). The ICS is configured to provide some level of computerized central control of at least some of the equipment within the facility.

Figure 2:
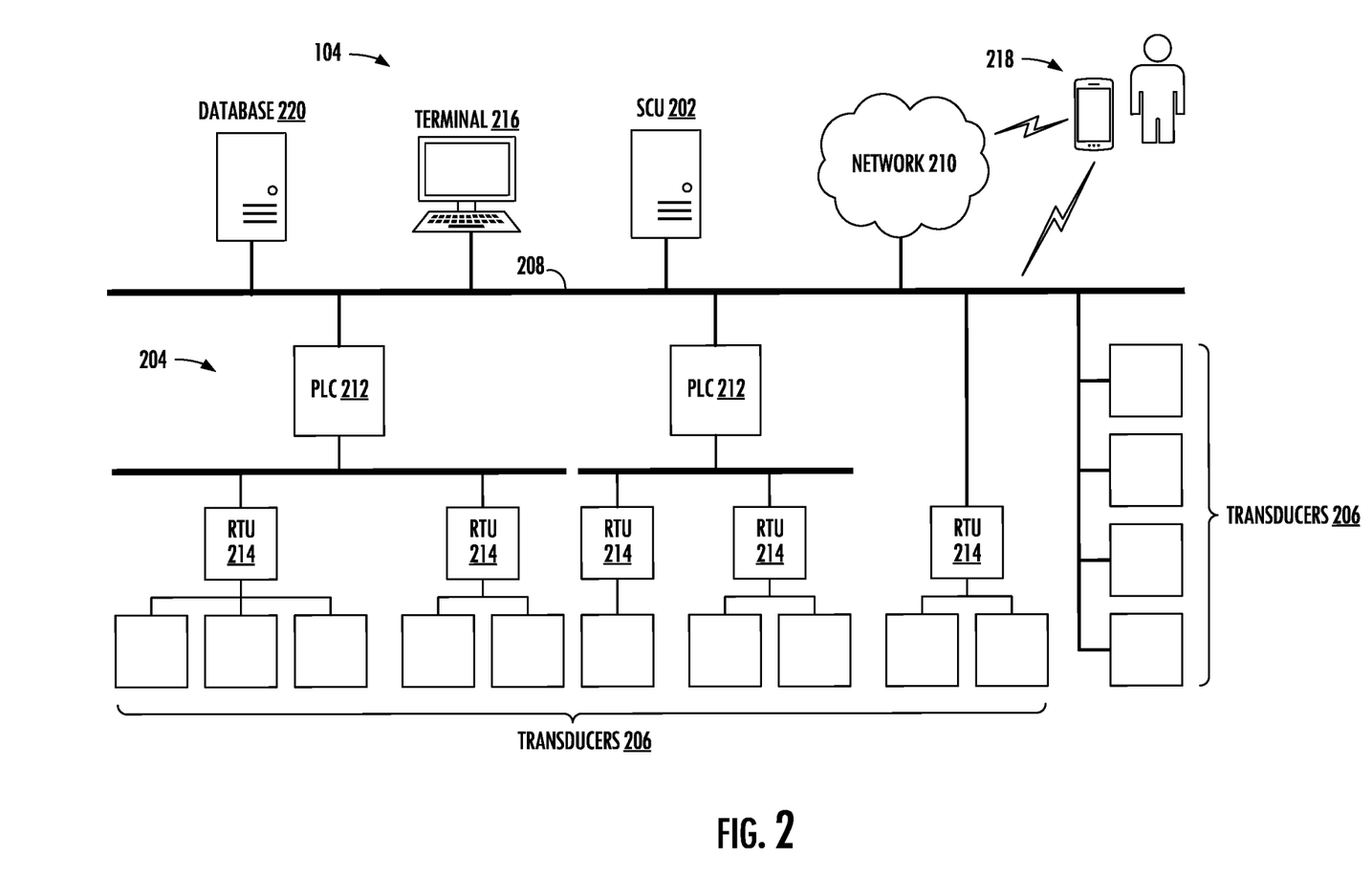
FIG. 2 illustrates a block diagram of an industrial control system, according to some example implementations.

FIG. 2 more particularly illustrates the ICS 104 according to some example implementations. As shown, the ICS includes the supervisory control unit (SCU) 202 configured to enable communication with and/or control of the equipment 102, such as by wired or wireless data links directly or across one or more networks. The ICS includes field connection units 204 to enable the SCU to communicate with the equipment, and in particular transducers 206 including actuators and/or sensors in the facility 100, some of which may be onboard the equipment.

The SCU 202 and the field connection units 204 may communicate by wired or wireless data links directly or across one or more networks, such as a control network 208. Examples of suitable communication protocols for the control network include TCP/IP, BACnet, LonTalk, Modbus, ZigBee, Zwave, Wi-Fi, SIMPLE, Bluetooth and the like. The control network may also be coupled to one or more networks 210 such as one or more telecommunications networks, computer networks or the like.

In some examples, the SCU 202 may be implemented as a supervisory computer, and the respective field connection units may be implemented as programmable logic controllers (PLCs) 212, remote terminal units (RTUs) 214, or some combination of PLCs and RTUs. The SCU may further communicate with a terminal 216 configured to provide a human-machine interface (HMI) to the SCU. The SCU may be integrated, co-located, or communicate with one or more of the field connection units and/or transducers 206 by wired or wireless data links directly or across the control network.

A facility operator may access the ICS 104 in a number of different ways, such as via the terminal 216. As also shown, the facility operator may access the ICS from a user device 218 such as a mobile device or other computer. The user device may be configured to access the ICS from the control network 208 via a local wireless or wired connection to the control network, or through the one or more networks 210. The control network can further comprise a database 220 for storing records and data as described herein. While FIG. 2 appears to depict the database as being directly connected to the control network, those having ordinary skill in the art will appreciate that the database can be located anywhere and merely be in communication with devices connected to the control network via the one or more networks or some other connection. For example, the database can be located in a cloud network and be in communication with the user device, the SCU, the terminal or any other of the devices connected to the control network via an Internet or other network connection. Furthermore, the database can be hosted on the user device itself.

The SCU 202 is configured to communicate with the transducers 206 for communication and/or control of the facility 100 and the equipment 102, such as to enable the SCU to control HVAC equipment, lighting control equipment, shading control equipment, security systems, and other mechanical, electrical equipment. In some particular examples, the transducers may include one or more actuators configured to control operation of the equipment. The transducers may also include one or more environmental sensors such as temperature sensors, humidity sensors, gas sensors like $CO_2$ sensors, occupancy sensors and the like.

Figure 3:
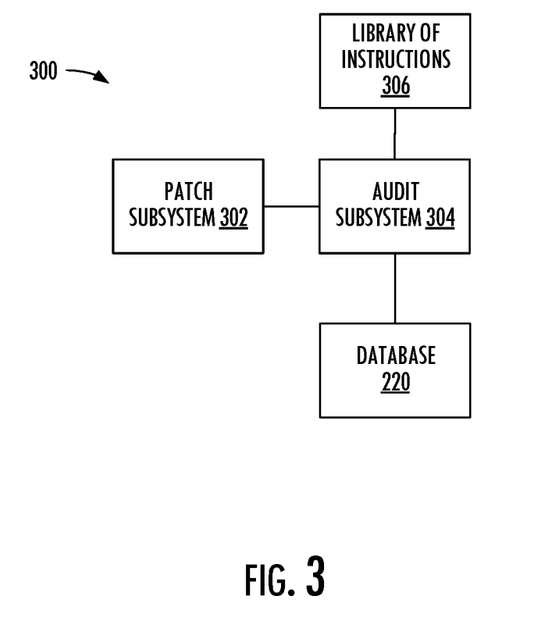
FIG. 3 illustrates a block diagram of a system for maintaining computer software of a supervisory control unit of an industrial control system, according to some example implementations.

FIG. 3 is a block diagram of a system 300 for maintaining computer software of the SCU 202 of the ICS 104, which may be implemented by a computer such as the terminal 216 or user device 218, according to example implementations of the present disclosure. The system includes any of a number of different subsystems (each an individual system) for performing one or more functions or operations. As shown, in some examples, the system includes one or more of each of a patch subsystem 302 and an audit subsystem 304. The subsystems may be co-located or directly coupled to one another, or in some examples, various ones of the subsystems may communicate with one another across one or more computer networks. It should also be understood that one or more of the subsystems may function or operate as a separate system without regard to any of the other subsystems, and that the system may include one or more additional or alternative subsystems than those shown in FIG. 3.

The patch subsystem 302 can be configured to initiate a patch of the computer software of the SCU 202 of the ICS 104, and patch the computer software automatically as a direct result of initiation of the patch. In this regard, the patch subsystem is configured to capture status information for the SCU and equipment 102 that indicates at least performance of the SCU and the equipment, and connectivity of the SCU with the equipment. In some instances, the status information is captured before the patch is applied to the computer software of the SCU. The status information that indicates performance of the SCU and equipment includes information on multiple ones of alarms generated by the SCU or the equipment, log messages generated by the SCU or the equipment, or conditioned air or water provided by at least some of the equipment that is environmental control equipment.

The patch subsystem 302 can be configured to apply the patch to the computer software of the SCU 202 to update, change, fix, or improve the computer software. That is, the patch can be an update to the computer software, such as a minor upgrade to fix an issue within a current major line of code or to add a new feature (e.g., updating from version 1.0 to 1.1, where version 1.1 is the same base code, or major version, as version 1.0, but version 1.1 includes fixes for bugs in version 1.0). The patch can also be an upgrade to the computer software, such as upgrading to the next major version of code (e.g., upgrading from version 1.0 to version 2.0, where version 2.0 is the next major version of code in the software upgrade path).

Once the patch has been installed or applied, and the SCU 202 has rebooted, in some instances, the patch subsystem 302 is configured to capture corresponding status information for the SCU and equipment 102. In other words, the patch subsystem can be configured to capture the same status information for the SCU and equipment after the patch is installed as was captured before the patch was installed. However, the patch subsystem does not immediately capture the corresponding status information for the SCU and equipment. In some examples, the patch subsystem first verifies that the SCU has returned to a designated zero wait state after reboot before the corresponding status information for the SCU and equipment is captured. Another way of putting this is that the patch subsystem waits until the SCU has reached a "steady state" status where the SCU is no longer bringing systems back online following reboot.

In some example implementations, the audit subsystem 304 is configured to perform an audit of the ICS 104 after the patch in which the status information and the corresponding status information are compared to identify any deviations in the performance or the connectivity of the equipment 102 resulting from the patch. And the audit subsystem is configured to generate an audit report of the ICS after the patch based on the audit, and that indicates any of the deviations that satisfy a reporting threshold.

In some examples, the patch subsystem 302 is further configured to connect the system 300 to the SCU 202 to establish a connection between the computer (such as the terminal 216 or user device 218) and the SCU. The patch may then be initiated, and the computer software may be patched, from the system, over the connection between the computer and the SCU.

In some examples, the system 300 is connected to the SCU 202 over a computer network such as either or both control network 208 or network 210. The patch may then be initiated, and the computer software may be patched, from the system, over the connection and thereby the computer network.

In some examples, the patch subsystem 302 is configured to store the captured status information and the corresponding status information into respective records in a database 220. The audit that is performed by the audit subsystem 304, then, includes a comparison of the status information and the corresponding status information from the respective records in the database. In facilitating this comparison, the patch subsystem is configured to capture the same information both before and after the patch is completed. Furthermore, the patch subsystem can be configured to store the status information in a uniform manner such that it can easily compare whether a particular status entry is the same before and after the patch.

For example, as a hypothetical, assume there are ten entries in the database 220 for before the patch and ten entries in the database after the patch, each of the ten entries containing a separate status information of 10 different transducers 206 (i.e., imagine a two column by ten row table, the first column including status information for the transducers before the patch, and the second column including corresponding status information for the same transducers after the patch is complete). The first entry in the first column is the status information for the first transducer, the second entry in the first column is the status information for the second transducer, and so on. In this way, the column 1, row 1 entry, indicating the status information of the first transducer before the patch, can be easily compared to the column 2, row 1 entry, indicating the status information of the first transducer after the patch is completed. Any suitable method of arranging the data can be utilized, but having a uniform method for storing the data will aid in its comparison later.

In some examples, a particular deviation is identified from the audit. In some of these examples, the audit subsystem 304 is further configured to identify an instruction for an action to address the particular deviation, from a library of instructions 306 to address possible deviations. And the audit subsystem is configured to provide the instruction for execution of the action to address the particular deviation. For example, the deviations can include that multiple devices that the SCU 202 controls are not operating properly (i.e., based on status logs, error messages, etc.). The instructions for fixing those deviations can include instructions to reboot the multiple devices or operate them in a different way, such as reconfiguring them. To determine the deviation, the system 300 receives or inspects the status logs and error messages from the multiple devices, compares the logs and error messages to previous error messages and logs stored in the library and determines corresponding instructions to provide based on similar or identical logs and error messages found in the library.

In some examples, a particular deviation is identified from the audit. In some of these examples, the audit subsystem 304 is further configured to determine the particular deviation is of a type that indicates the patch failed. And, as a direct result of this, the audit subsystem is configured to cause the patch subsystem 302 to reinitiate the patch, and again patch the computer software automatically as a direct result of reinitiation of the patch.

In some examples, the patch is initiated, and the computer software is patched, from the system 300 connected to the SCU. In some of these examples, the system is further configured to transmit the audit report to a second computer for either or both display or comparison to a previous audit report.

In some examples, a particular deviation that is identified from the audit indicates a fault or failure in the ICS 104. In some of these examples, the system 300 is further configured to automatically alter an operating state of the ICS to compensate for the fault or failure. For example, following a software patch, a particular HVAC unit is no longer operating or is operating at a diminished capacity. It is determined that the deviation is that a building or room in the building is not at the desired temperature (i.e., the temperature at which the thermostat is set). The audit subsystem 304 can identify, based on that deviation, instructions for altering the temperature in the building or room to conform with the temperature set on the thermostat. For example, instructions to resolve the issue can be identified as instructing an auxiliary HVAC unit to turn on and deliver air at the proper temperature to address the temperature issue. Other instructions identified can include instructions for rebooting systems, altering the configuration of systems (e.g., changing output air or water temperature, output power, etc.).

In yet another example, the audit determines, from analysis of the logs, that the ICS 104 or equipment 102 controlled by the ICS is operating in an error state or in a state that is otherwise contrary to its normal operation. The particular equipment might not be able to be fixed automatically by the ICS or the SCU 202. In such a case, the audit subsystem 304 can be configured to transmit instructions to a user to use and manually fix the issue. For example, if it is determined from the logs that a capacitor is broken on the equipment, instructions can be sent to the user to determine which capacitor blew and replace it.

FIGS. 4A-4H are flowcharts illustrating various steps in a method 400 of maintaining computer software of a SCU of an ICS configured to control equipment of a facility, according to various example implementations of the present disclosure. The method includes initiating a patch of the computer software of the SCU, as shown at block 402 of FIG. 4A. And the method includes patching the computer software automatically as a direct result of the initiating, as shown at 404. In this regard, patching the computer software includes capturing status information for the SCU and equipment that indicates at least performance of the SCU and the equipment, and connectivity of the SCU with the equipment, as shown at block 406. The patch is applied to the computer software of the SCU to update, change, fix, or improve the computer software, as shown at block 408; and corresponding status information for the SCU and equipment is captured, as shown at block 410.

Figure 4A:
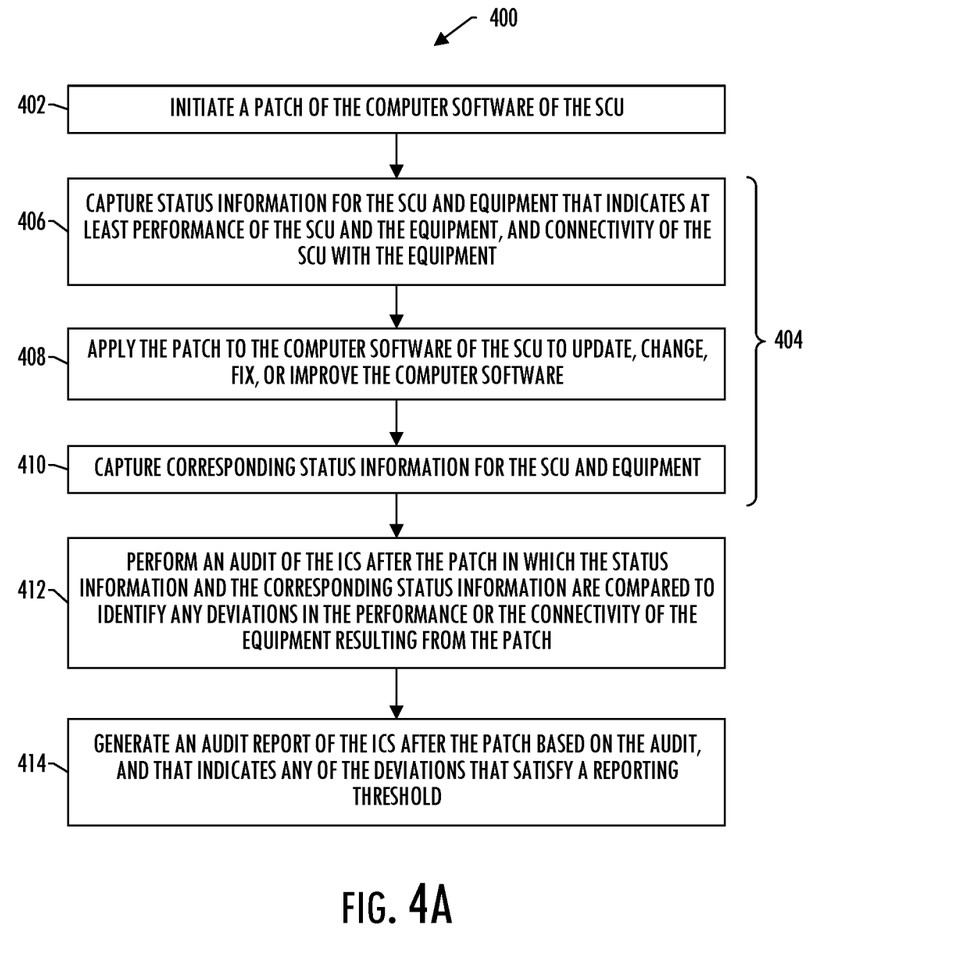
FIGS. 4A, 4B, 4C, 4D, 4E, 4F, 4G and 4H are flowcharts illustrating various steps in a method of maintaining computer software, according to example implementations.

The method 400 also includes performing an audit of the ICS after the patch in which the status information and the corresponding status information are compared to identify any deviations in the performance or the connectivity of the equipment resulting from the patch, as shown at block 412. And the method includes generating an audit report of the ICS after the patch based on the audit, and that indicates any of the deviations that satisfy a reporting threshold, as shown at block 414.

Figure 4B:
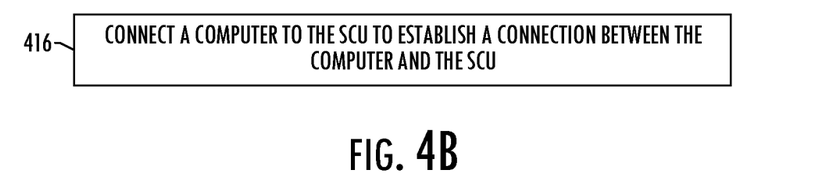

In some examples, the method 400 further includes connecting a computer to the SCU to establish a connection between the computer and the SCU, as shown at block 416 of FIG. 4B. In some of these examples, the patch is initiated at block 402, and the computer software is patched at 404, from the computer, over the connection between the computer and the SCU.

In some examples, the computer is connected to the SCU over a computer network, and the patch is initiated at block 402, and the computer software is patched at 404, from the computer, over the connection and thereby the computer network.

In some examples, the status information that indicates the performance of the SCU and the equipment includes information on multiple ones of alarms generated by the SCU or the equipment, log messages generated by the SCU or the equipment, a software configuration of the SCU and equipment, a power status of the equipment, or conditioned air or water provided by at least some of the equipment that is environmental control equipment.

Figure 4C:
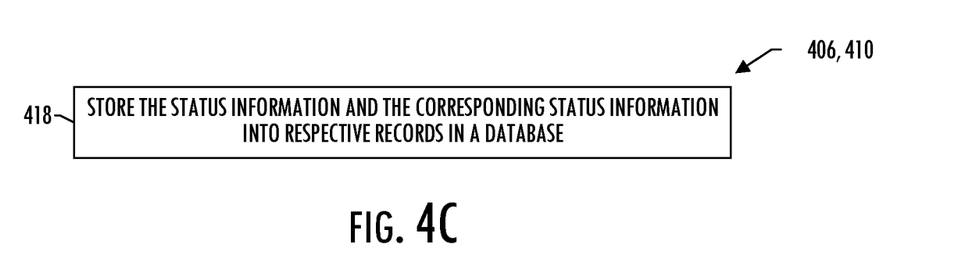
Figure 4D:
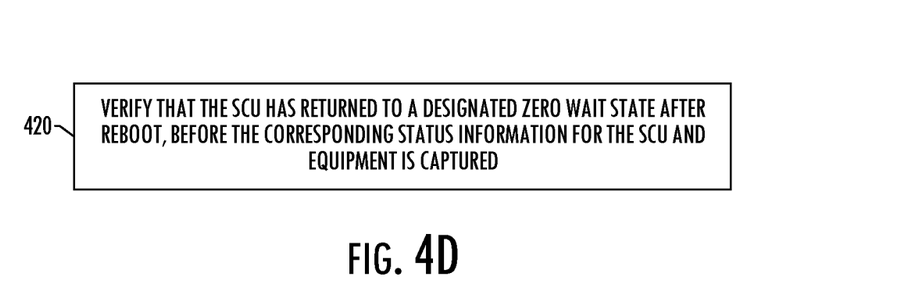
Figure 4E:
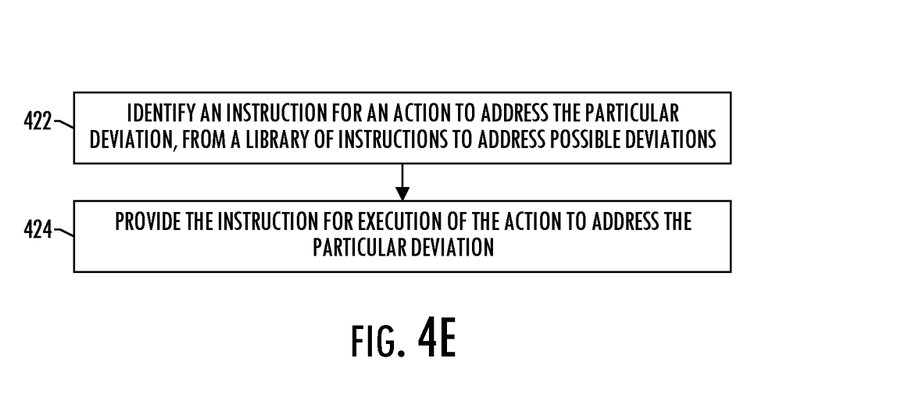

In some examples, capturing the status information and the corresponding status information at blocks 406 and 410 includes storing the status information and the corresponding status information into respective records in a database, as shown at block 418 of FIG. 4C. In some of these examples, the audit that is performed at block 412 includes a comparison of the status information and the corresponding status information from the respective records in the database.

In some examples, the SCU is rebooted after the patch is applied. In some of these examples, the method 400 further includes verifying that the SCU has returned to a designated zero wait state after reboot, before the corresponding status information for the SCU and equipment is captured at block 410, as shown at block 420 of FIG. 4D.

In some examples, a particular deviation is identified from the audit. In some of these examples, the method further includes identifying an instruction for an action to address the particular deviation, from a library of instructions to address possible deviations, as shown at block 422 of FIG. 4E. And the method includes providing the instruction for execution of the action to address the particular deviation, as shown at block 424.

Figure 4F:
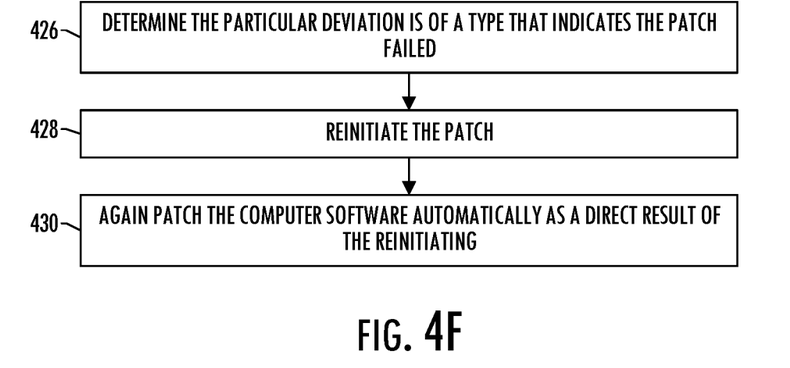
Figure 4G:
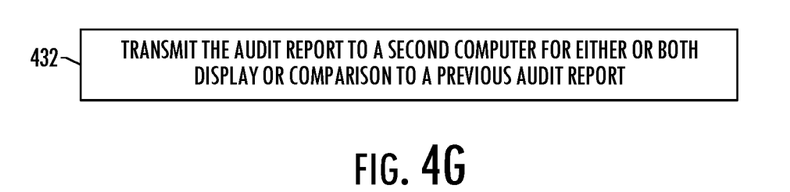
Figure 4H:
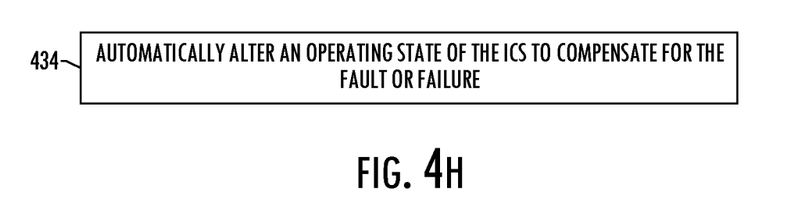

In some examples in which a particular deviation is identified from the audit, the method further includes determining the particular deviation is of a type that indicates the patch failed, as shown at block 426 of FIG. 4F. And automatically as a direct result this determining, the patch is reinitiated, and the computer software is again patched automatically as a direct result of the reinitiating, as shown at blocks 428 and 430.

In some examples, the patch is initiated at block 402, and the computer software is patched at 404, from a computer connected to the SCU. In some of these examples, the method 400 further includes the computer transmitting the audit report to a second computer for either or both display or comparison to a previous audit report, as shown at block 432 of FIG. 4G.

In some examples, a particular deviation that is identified from the audit indicates a fault or failure in the ICS. In some of these examples, the method 400 further includes automatically altering an operating state of the ICS to compensate for the fault or failure, as shown at block 434 of FIG. 4H.

According to example implementations of the present disclosure, the system 300 and its subsystems may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 5:
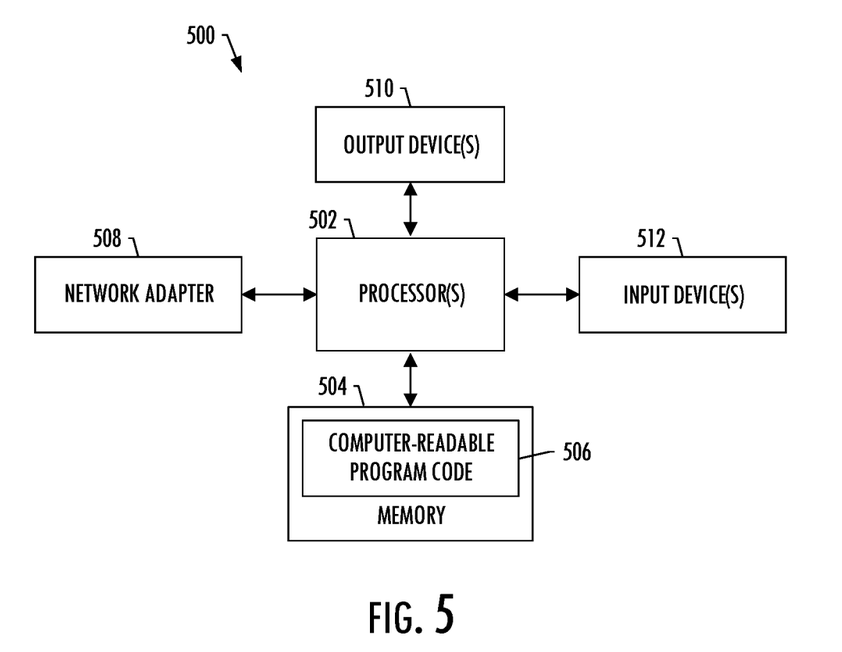
FIG. 5 illustrates an apparatus according to some example implementations.

FIG. 5 illustrates an apparatus 500 for maintaining computer software of an SCU 202 of an ICS 104 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer, PLC, circuit board or the like. The apparatus may include one or more of each of a number of components such as, for example, a processor 502 connected to a memory 504.

The processor 502 is generally any piece of computer hardware capable of processing information such as, for example, data, computer programs and/or other suitable electronic information. The processor includes one or more electronic circuits some of which may be packaged as an integrated circuit or multiple interconnected integrated circuits (an integrated circuit at times more commonly referred to as a "chip"). The processor may be a number of processors, a multi-core processor or some other type of processor, depending on the particular implementation.

The processor 502 may be configured to execute computer programs such as computer-readable program code 506, which may be stored onboard the processor or otherwise stored in the memory 504. In some examples, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 504 is generally any piece of computer hardware capable of storing information such as, for example, data, computer-readable program code 506 or other computer programs, and/or other suitable information either on a temporary basis and/or a permanent basis. The memory may include volatile memory such as random access memory (RAM), and/or non-volatile memory such as a hard drive, flash memory or the like. In various instances, the memory may be referred to as a computer-readable storage medium, which is a non-transitory device capable of storing information. In some examples, then, the computer-readable storage medium is non-transitory and has computer-readable program code stored therein that, in response to execution by the processor 502, causes the apparatus 500 to perform various operations as described herein, some of which may in turn cause the electrical equipment 112 to perform various operations.

In addition to the memory 504, the processor 502 may also be connected to one or more peripherals such as a network adapter 508, one or more input/output (I/O) devices or the like. The network adapter is a hardware component configured to connect the apparatus 500 to one or more networks to enable the apparatus to transmit and/or receive information via the one or more networks. This may include transmission and/or reception of information via one or more networks through a wired or wireless connection using Wi-Fi, Bluetooth, BACnet, LonTalk, Modbus, ZigBee, Zwave, or the like, or other suitable wired or wireless communication protocols.

The I/O devices may include one or more input devices 510 capable of receiving data or instructions for the apparatus 500, and/or one or more output devices 512 capable of providing an output from the apparatus. Examples of suitable input devices include a keyboard, keypad or the like, and examples of suitable output devices include a display device such as a one or more light-emitting diodes (LEDs), a LED display, a liquid crystal display (LCD), or the like.

As explained above and reiterated below, the present disclosure includes, without limitation, the following example implementations.

Clause 1. An apparatus for maintaining computer software of a supervisory control unit (SCU) of an industrial control system (ICS) configured to control equipment of a facility, the apparatus comprising: a memory configured to store computer-readable program code; and one or more processors configured to access the memory, and execute the computer-readable program code to cause the apparatus to at least: initiate a patch of the computer software of the SCU; and patch the computer software automatically as a direct result of initiation of the patch, including the apparatus caused to: capture status information for the SCU and equipment that indicates at least performance of the SCU and the equipment, and connectivity of the SCU with the equipment; apply the patch to the computer software of the SCU to update, change, fix, or improve the computer software; and capture corresponding status information for the SCU and equipment; perform an audit of the ICS after the patch in which the status information and the corresponding status information are compared to identify any deviations in the performance or the connectivity of the equipment resulting from the patch; and generate an audit report of the ICS after the patch based on the audit, and that indicates any of the deviations that satisfy a reporting threshold.

Clause 2. The apparatus of clause 1, wherein the one or more processors is configured to execute the computer-readable program code to cause the apparatus to further connect the apparatus to the SCU to establish a connection between the apparatus and the SCU, and wherein the patch is initiated, and the computer software is patched, from the apparatus, over the connection between the computer and the SCU.

Clause 3. The apparatus of clause 2, wherein the apparatus is connected to the SCU over a computer network, and wherein the patch is initiated, and the computer software is patched, from the apparatus, over the connection and thereby the computer network.

Clause 4. The apparatus of any of clauses 1 to 3, wherein the status information that indicates the performance of the SCU and the equipment includes information on multiple ones of alarms generated by the SCU or the equipment, log messages generated by the SCU or the equipment, a software configuration of the SCU and equipment, a power status of the equipment, or conditioned air or water provided by at least some of the equipment that is environmental control equipment.

Clause 5. The apparatus of any of clauses 1 to 4, wherein the apparatus caused to capture the status information and the corresponding status information includes the apparatus caused to store the status information and the corresponding status information into respective records in a database, and wherein the audit that is performed includes a comparison of the status information and the corresponding status information from the respective records in the database.

Clause 6. The apparatus of any of clauses 1 to 5, wherein the SCU is rebooted after the patch is applied, and the one or more processors is configured to execute the computer-readable program code to cause the apparatus to further verify that the SCU has returned to a designated zero wait state after reboot, before the corresponding status information for the SCU and equipment is captured.

Clause 7. The apparatus of any of clauses 1 to 6, wherein a particular deviation is identified from the audit, and the one or more processors is configured to execute the computer-readable program code to cause the apparatus to further at least: identify an instruction for an action to address the particular deviation, from a library of instructions to address possible deviations; and provide the instruction for execution of the action to address the particular deviation.

Clause 8. The apparatus of any of clauses 1 to 7, wherein a particular deviation is identified from the audit, and the one or more processors is configured to execute the computer-readable program code to cause the apparatus to further at least: determine the particular deviation is of a type that indicates the patch failed; and automatically as a direct result thereof, reinitiate the patch, and again patch the computer software automatically as a direct result of reinitiation of the patch.

Clause 9. The apparatus of any of clauses 1 to 8, wherein the patch is initiated, and the computer software is patched, from the apparatus connected to the SCU, and wherein the one or more processors is configured to execute the computer-readable program code to cause the apparatus to further transmit the audit report to a second computer for either or both display or comparison to a previous audit report.

Clause 10. The apparatus of any of clauses 1 to 9, wherein a particular deviation that is identified from the audit indicates a fault or failure in the ICS, and the one or more processors is configured to execute the computer-readable program code to cause the apparatus to further automatically alter an operating state of the ICS to compensate for the fault or failure.

Clause 11. A method of maintaining computer software of a supervisory control unit (SCU) of an industrial control system (ICS) configured to control equipment of a facility, the method comprising: initiating a patch of the computer software of the SCU; and patching the computer software automatically as a direct result of the initiating, including: capturing status information for the SCU and equipment that indicates at least performance of the SCU and the equipment, and connectivity of the SCU with the equipment; applying the patch to the computer software of the SCU to update, change, fix, or improve the computer software; and capturing corresponding status information for the SCU and equipment; performing an audit of the ICS after the patch in which the status information and the corresponding status information are compared to identify any deviations in the performance or the connectivity of the equipment resulting from the patch; and generating an audit report of the ICS after the patch based on the audit, and that indicates any of the deviations that satisfy a reporting threshold.

Clause 12. The method of clause 11, wherein the method further comprises connecting a computer to the SCU to establish a connection between the computer and the SCU, and wherein the patch is initiated, and the computer software is patched, from the computer, over the connection between the computer and the SCU.

Clause 13. The method of clause 12, wherein the computer is connected to the SCU over a computer network, and wherein the patch is initiated, and the computer software is patched, from the computer, over the connection and thereby the computer network.

Clause 14. The method of any of clauses 11 to 13, wherein the status information that indicates the performance of the SCU and the equipment includes information on multiple ones of alarms generated by the SCU or the equipment, log messages generated by the SCU or the equipment, a software configuration of the SCU and equipment, a power status of the equipment, or conditioned air or water provided by at least some of the equipment that is environmental control equipment.

Clause 15. The method of any of clauses 11 to 14, wherein capturing the status information and the corresponding status information includes storing the status information and the corresponding status information into respective records in a database, and wherein the audit that is performed includes a comparison of the status information and the corresponding status information from the respective records in the database.

Clause 16. The method of any of clauses 11 to 15, wherein the SCU is rebooted after the patch is applied, and the method further comprises verifying that the SCU has returned to a designated zero wait state after reboot, before the corresponding status information for the SCU and equipment is captured.

Clause 17. The method of any of clauses 11 to 16, wherein a particular deviation is identified from the audit, and the method further comprises: identifying an instruction for an action to address the particular deviation, from a library of instructions to address possible deviations; and providing the instruction for execution of the action to address the particular deviation.

Clause 18. The method of any of clauses 11 to 17, wherein a particular deviation is identified from the audit, and the method further comprises: determining the particular deviation is of a type that indicates the patch failed; and automatically as a direct result thereof, reinitiating the patch, and again patching the computer software automatically as a direct result of the reinitiating.

Clause 19. The method of any of clauses 11 to 18, wherein the patch is initiated, and the computer software is patched, from a computer connected to the SCU, and wherein the method further comprises the computer transmitting the audit report to a second computer for either or both display or comparison to a previous audit report.

Clause 20. The method of any of clauses 11 to 19, wherein a particular deviation that is identified from the audit indicates a fault or failure in the ICS, and the method further comprises automatically altering an operating state of the ICS to compensate for the fault or failure.

Clause 21. A computer-readable storage medium for maintaining computer software of a supervisory control unit (SCU) of an industrial control system (ICS) configured to control equipment of a facility, the computer-readable storage medium being non-transitory and having computer-readable program code stored therein that, in response to execution by one or more processors, causes an apparatus to at least: initiate a patch of the computer software of the SCU; and patch the computer software automatically as a direct result of initiation of the patch, including the apparatus caused to: capture status information for the SCU and equipment that indicates at least performance of the SCU and the equipment, and connectivity of the SCU with the equipment; apply the patch to the computer software of the SCU to update, change, fix, or improve the computer software; and capture corresponding status information for the SCU and equipment; perform an audit of the ICS after the patch in which the status information and the corresponding status information are compared to identify any deviations in the performance or the connectivity of the equipment resulting from the patch; and generate an audit report of the ICS after the patch based on the audit, and that indicates any of the deviations that satisfy a reporting threshold.

Clause 22. The computer-readable storage medium of clause 21, wherein the computer-readable storage medium has further computer-readable program code stored therein that, in response to execution by the one or more processors, causes the apparatus to further connect a computer to the SCU to establish a connection between the computer and the SCU, and wherein the patch is initiated, and the computer software is patched, from the computer, over the connection between the computer and the SCU.

Clause 23. The computer-readable storage medium of clause 22, wherein the computer is connected to the SCU over a computer network, and wherein the patch is initiated, and the computer software is patched, from the computer, over the connection and thereby the computer network.

Clause 24. The computer-readable storage medium of any of clauses 21 to 23, wherein the status information that indicates the performance of the SCU and the equipment includes information on multiple ones of alarms generated by the SCU or the equipment, log messages generated by the SCU or the equipment, a software configuration of the SCU and equipment, a power status of the equipment, or conditioned air or water provided by at least some of the equipment that is environmental control equipment.

Clause 25. The computer-readable storage medium of any of clauses 21 to 24, wherein the apparatus caused to capture the status information and the corresponding status information includes the apparatus caused to store the status information and the corresponding status information into respective records in a database, and wherein the audit that is performed includes a comparison of the status information and the corresponding status information from the respective records in the database.

Clause 26. The computer-readable storage medium of any of clauses 21 to 25, wherein the SCU is rebooted after the patch is applied, and the computer-readable storage medium has further computer-readable program code stored therein that, in response to execution by the one or more processors, causes the apparatus to further verify that the SCU has returned to a designated zero wait state after reboot, before the corresponding status information for the SCU and equipment is captured.

Clause 27. The computer-readable storage medium of any of clauses 21 to 26, wherein a particular deviation is identified from the audit, and the computer-readable storage medium has further computer-readable program code stored therein that, in response to execution by the one or more processors, causes the apparatus to further at least: identify an instruction for an action to address the particular deviation, from a library of instructions to address possible deviations; and provide the instruction for execution of the action to address the particular deviation.

Clause 28. The computer-readable storage medium of any of clauses 21 to 27, wherein a particular deviation is identified from the audit, and the computer-readable storage medium has further computer-readable program code stored therein that, in response to execution by the one or more processors, causes the apparatus to further at least: determine the particular deviation is of a type that indicates the patch failed; and automatically as a direct result thereof, reinitiate the patch, and again patch the computer software automatically as a direct result of reinitiation of the patch.

Clause 29. The computer-readable storage medium of any of clauses 21 to 28, wherein the patch is initiated, and the computer software is patched, from the apparatus connected to the SCU, and wherein the computer-readable storage medium has further computer-readable program code stored therein that, in response to execution by the one or more processors, causes the apparatus to further transmit the audit report to a second computer for either or both display or comparison to a previous audit report.

Clause 30. The computer-readable storage medium of any of clauses 21 to 29, wherein a particular deviation that is identified from the audit indicates a fault or failure in the ICS, and the computer-readable storage medium has further computer-readable program code stored therein that, in response to execution by the one or more processors, causes the apparatus to further automatically alter an operating state of the ICS to compensate for the fault or failure.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for maintaining computer software of a supervisory control unit (SCU) of an industrial control system (ICS) configured to control equipment of a facility, the apparatus comprising:
   a memory configured to store computer-readable program code; and
   one or more processors configured to access the memory, and execute the computer-readable program code to cause the apparatus to at least:
   initiate a patch of the computer software of the SCU; and
   patch the computer software automatically as a direct result of initiation of the patch, including the apparatus caused to:
      capture status information for the SCU and equipment that indicates at least performance of the SCU and the equipment, and connectivity of the SCU with the equipment;
      apply the patch to the computer software of the SCU to update, change, fix, or improve the computer software; and
      capture corresponding status information for the SCU and equipment;
   perform an audit of the ICS after the patch in which the status information and the corresponding status information are compared to identify any deviations in the performance or the connectivity of the equipment resulting from the patch; and
   generate an audit report of the ICS after the patch based on the audit, and that indicates any of the deviations that satisfy a reporting threshold.

2. The apparatus of claim 1,
   wherein the one or more processors is configured to execute the computer-readable program code to cause the apparatus to further connect the apparatus to the SCU to establish a connection between the apparatus and the SCU, and wherein the patch is initiated, and the computer software is patched, from the apparatus, over the connection between the apparatus and the SCU.

3. The apparatus of claim 2, wherein the apparatus is connected to the SCU over a computer network, and
   wherein the patch is initiated, and the computer software is patched, from the apparatus, over the connection and thereby the computer network.

4. The apparatus of claim 1, wherein the status information that indicates the performance of the SCU and the equipment includes information on multiple ones of alarms generated by the SCU or the equipment, log messages generated by the SCU or the equipment, a software configuration of the SCU and equipment, a power status of the equipment, or conditioned air or water provided by at least some of the equipment that is environmental control equipment.

5. The apparatus of claim 1, wherein the apparatus caused to capture the status information and the corresponding status information includes the apparatus caused to store the status information and the corresponding status information into respective records in a database, and
   wherein the audit that is performed includes a comparison of the status information and the corresponding status information from the respective records in the database.

6. The apparatus of claim 1, wherein the SCU is rebooted after the patch is applied, and the one or more processors is configured to execute the computer-readable program code to cause the apparatus to further verify that the SCU has returned to a designated zero wait state after reboot, before the corresponding status information for the SCU and equipment is captured.

7. The apparatus of claim 1, wherein a particular deviation is identified from the audit, and the one or more processors is configured to execute the computer-readable program code to cause the apparatus to further at least:
   identify an instruction for an action to address the particular deviation, from a library of instructions to address possible deviations; and
   provide the instruction for execution of the action to address the particular deviation.

8. The apparatus of claim 1, wherein a particular deviation is identified from the audit, and the one or more processors is configured to execute the computer-readable program code to cause the apparatus to further at least:
   determine the particular deviation is of a type that indicates the patch failed; and automatically as a direct result thereof,
   reinitiate the patch, and again patch the computer software automatically as a direct result of reinitiation of the patch.

9. The apparatus of claim 1, wherein the patch is initiated, and the computer software is patched, from the apparatus connected to the SCU, and
   wherein the one or more processors is configured to execute the computer-readable program code to cause the apparatus to further transmit the audit report to a second computer for either or both display or comparison to a previous audit report.

10. The apparatus of claim 1, wherein a particular deviation that is identified from the audit indicates a fault or failure in the ICS, and the one or more processors is configured to execute the computer-readable program code to cause the apparatus to further automatically alter an operating state of the ICS to compensate for the fault or failure.

11. A method of maintaining computer software of a supervisory control unit (SCU) of an industrial control system (ICS) configured to control equipment of a facility, the method comprising:
   initiating a patch of the computer software of the SCU; and patching the computer software automatically as a direct result of the initiating, including:
  capturing status information for the SCU and equipment that indicates at least performance of the SCU and the equipment, and connectivity of the SCU with the equipment;
  applying the patch to the computer software of the SCU to update, change, fix, or improve the computer software; and
  capturing corresponding status information for the SCU and equipment;
performing an audit of the ICS after the patch in which the status information and the corresponding status information are compared to identify any deviations in the performance or the connectivity of the equipment resulting from the patch; and
generating an audit report of the ICS after the patch based on the audit, and that indicates any of the deviations that satisfy a reporting threshold.

12. The method of claim 11, wherein the method further comprises connecting a computer to the SCU to establish a connection between the computer and the SCU, and
  wherein the patch is initiated, and the computer software is patched, from the computer, over the connection between the computer and the SCU.

13. The method of claim 12, wherein the computer is connected to the SCU over a computer network, and
  wherein the patch is initiated, and the computer software is patched, from the computer, over the connection and thereby the computer network.

14. The method of claim 11, wherein the status information that indicates the performance of the SCU and the equipment includes information on multiple ones of alarms generated by the SCU or the equipment, log messages generated by the SCU or the equipment, a software configuration of the SCU and equipment, a power status of the equipment, or conditioned air or water provided by at least some of the equipment that is environmental control equipment.

15. The method of claim 11, wherein capturing the status information and the corresponding status information includes storing the status information and the corresponding status information into respective records in a database, and
  wherein the audit that is performed includes a comparison of the status information and the corresponding status information from the respective records in the database.

16. The method of claim 11, wherein the SCU is rebooted after the patch is applied, and the method further comprises verifying that the SCU has returned to a designated zero wait state after reboot, before the corresponding status information for the SCU and equipment is captured.

17. The method of claim 11, wherein a particular deviation is identified from the audit, and the method further comprises:
  identifying an instruction for an action to address the particular deviation, from a library of instructions to address possible deviations; and
  providing the instruction for execution of the action to address the particular deviation.

18. The method of claim 11, wherein a particular deviation is identified from the audit, and the method further comprises:
  determining the particular deviation is of a type that indicates the patch failed; and automatically as a direct result thereof,
  reinitiating the patch, and again patching the computer software automatically as a direct result of the reinitiating.

19. The method of claim 11, wherein the patch is initiated, and the computer software is patched, from a computer connected to the SCU, and
  wherein the method further comprises the computer transmitting the audit report to a second computer for either or both display or comparison to a previous audit report.

20. The method of claim 11, wherein a particular deviation that is identified from the audit indicates a fault or failure in the ICS, and the method further comprises automatically altering an operating state of the ICS to compensate for the fault or failure.

* * * * *